Figure 1:
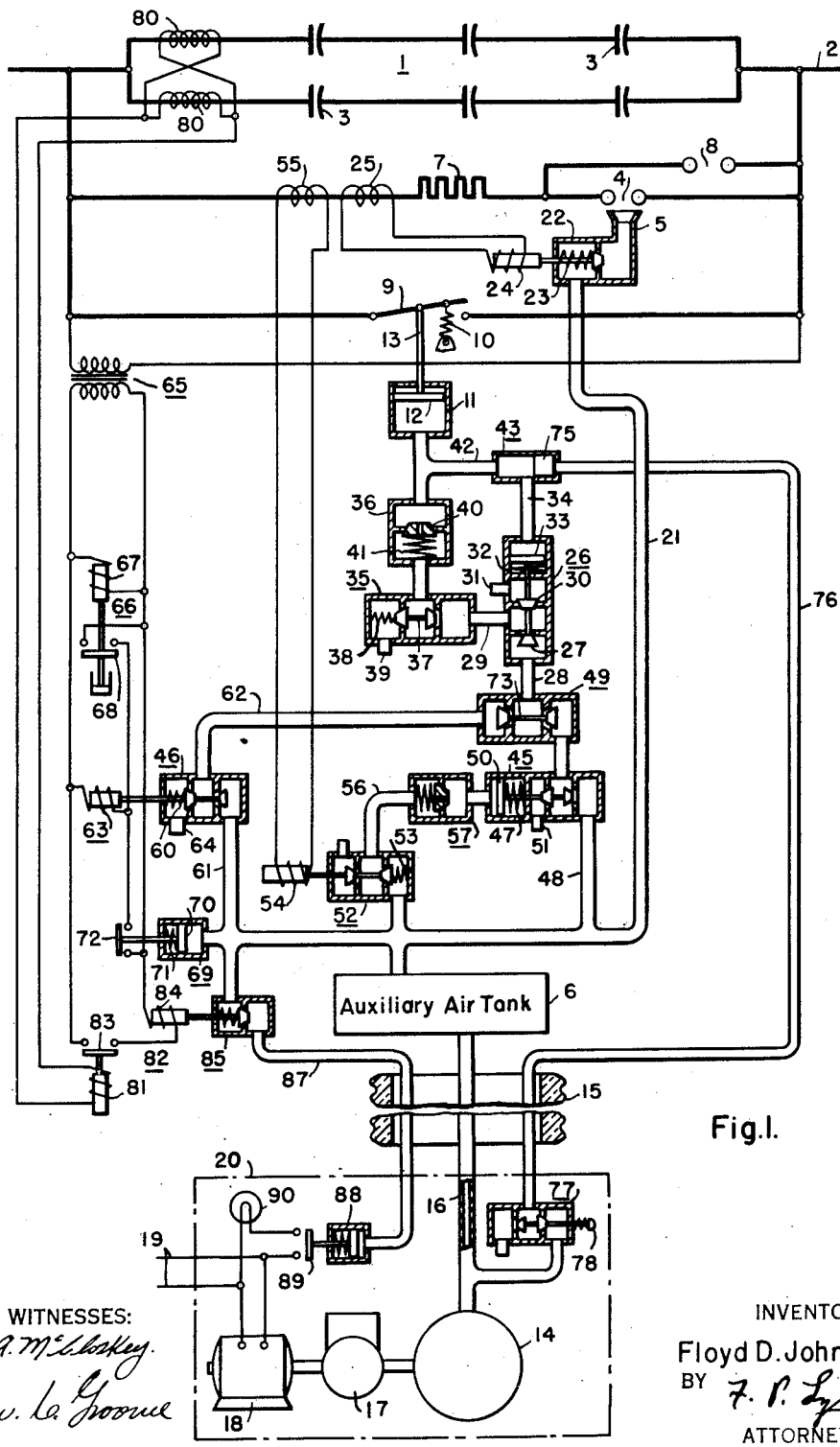

Feb. 5, 1952     F. D. JOHNSON     2,584,710
PROTECTIVE SYSTEM FOR SERIES CAPACITORS
Filed Feb. 23, 1951     2 SHEETS—SHEET 1

WITNESSES:
E. A. McCloskey
Rev. Le Groome

INVENTOR
Floyd D. Johnson.
BY F. P. Lyle
ATTORNEY

Patented Feb. 5, 1952

2,584,710

UNITED STATES PATENT OFFICE 2,584,710

PROTECTIVE SYSTEM FOR SERIES CAPACITORS

Floyd D. Johnson, Pittsburgh, Pa., assignor to Westinghouse Electric Corporation, East Pittsburgh, Pa., a corporation of Pennsylvania Application February 23, 1951, Serial No. 212,449

14 Claims. (Cl. 175—294)

1

The present invention relates to series capacitor installations in alternating-current lines and, more particularly, to a protective system for series capacitors installed in high-voltage, synchronous, alternating-current transmission lines where system stability is a primary or limiting consideration in the operation of the line.

Capacitors are connected in series in alternating-current transmission or distribution lines to neutralize part, or all, of the inductive reactance of the line, in order to raise the stability limit, or the power limit, of a transmission line, or to improve the voltage regulation of a distribution line. Since such capacitors are connected in series in the line and carry the line current, the voltage across the capacitor is proportional to the line current, and in case of a fault on the line, the voltage across the capacitor may rise to many times its normal value. Standard capacitor units, such as are used in series capacitor installations, are capable of withstanding overvoltages of the order of 150% of their normal rated voltage for brief periods, or somewhat higher voltages momentarily, but they cannot be subjected to voltages in excess of about 250% to 300% of normal voltage, even momentarily without the probability of damage.

It is not practical to utilize capacitors which are capable of withstanding the maximum voltage to which they may be subjected under fault conditions, because of the excessive cost, since the cost of a capacitor increases approximately as the square of the voltage for which it is designed. A series capacitor installation, therefore, usually consists of capacitor units having a voltage rating determined on the basis of the normal voltage across the capacitor, together with a protective system for by-passing the capacitor under fault conditions, or other excess-current conditions, in order to protect the capacitor against overvoltage. In order to adequately protect the capacitor, the protective system must operate to by-pass it substantially instantaneously upon the occurrence of an overvoltage of predetermined magnitude, that is, the capacitor must be effectively by-passed within the first half-cycle of fault current. Because of this requirement of substantially instantaneous operation, spark gaps are usually used in these protective systems, since no switch, or other device involving moving parts or mechanical movement, could operate fast enough.

When a series capacitor is installed in a high-voltage transmission line for the primary purpose of raising the stability limit, to increase the amount of power that can be transmitted over the line, the problem of protection is especially difficult. This is for the reason that, since the capacitor must be effectively by-passed upon the occurrence of an overvoltage, it is removed from service during a fault. In order for the capacitor to be of use for its intended purpose, however, the capacitor must be restored to service substantially instantaneously when the fault is cleared, so as to be available to assist in maintaining stability during the critical transient conditions immediately following clearing of the fault, and especially in the first few cycles after the fault is cleared when the stability conditions are most critical. The protective system for the series capacitor must therefore operate not only to by-pass the capacitor substantially instantaneously upon the occurrence of a predetermined overvoltage across the capacitor, but also to remove the by-pass and restore the capacitor to service substantially instantaneously when the fault is cleared and the line current returns to or near its normal value.

A protective system capable of operation in this manner is disclosed and claimed in the co-pending applications of R. E. Marbury, Serial No. 110,947, filed August 18, 1949, and Serial No. 146,-299, filed February 25, 1950, now Patent No. 2,576,132, both assigned to Westinghouse Electric Corporation. In this system, the capacitor is protected by a main spark gap device which breaks down and by-passes the capacitor immediately upon the occurrence of a predetermined overvoltage. The gap device is made self-clearing by means of an air blast, which is turned on as soon as the gap has broken down, so that the arc in the gap is extinguished at each current zero and restrikes on the succeeding half-cycle as soon as the voltage has risen to a value near the initial break-down voltage. Thus, if the voltage in any half-cycle does not rise above a safe value, the arc will not restrike and the capacitor is restored to service in the first half-cycle after the fault is cleared. In an actual installation, the capacitor must also be protected against failure of the gap to operate, and against sustained overvoltages which are too low to cause operation of the gap but high enough to be dangerous to the capacitor if allowed to continue for an extended time. The gap device must also be protected against continued arcing for periods of time long enough to cause damage to the gap. In the system disclosed in the second Marbury application referred to above, protection against these conditions is provided by means of a by-pass switch connected across the capacitor and biased to closed position. The by-pass switch is normally held open by air pressure in a pneumatic cylinder connected to the switch, and means are provided responsive to the various abnormal conditions mentioned above for exhausting the air from the cylinder to allow the by-pass switch to close to protect the capacitor and the gap.

The principal object of the present invention is to provide an improved system of the type described above for the protection of series capacitors in high-voltage transmission lines.

Another object of the invention is to provide a protective system for series capacitors in which the capacitor is protected by a self-clearing gap device and also by a by-pass switch which is biased to closed position and normally held open by air pressure in a pneumatic cylinder, and in which means are provided for rapidly and reliably exhausting air from the cylinder upon the occurrence of predetermined abnormal conditions to permit the by-pass switch to close, a simple push-button control being provided for reopening the by-pass switch.

A further object of the invention is to provide a protective system for series capacitors in which the capacitor is protected by a self-clearing gap device and by a by-pass switch which is normally held open by means of air pressure in a pneumatic cylinder, and in which air is supplied to the cylinder through a main valve device which is biased to closed position but normally held open by air pressure. Electropneumatic control means are provided for exhausting the air from the cylinder and from the main valve device upon the occurrence of certain abnormal conditions, to permit the by-pass switch to close and to permit the main valve device to move to closed position, the valve remaining closed to cut off the air supply to the cylinder until it is reopened by remote manual means.

Figure 2:
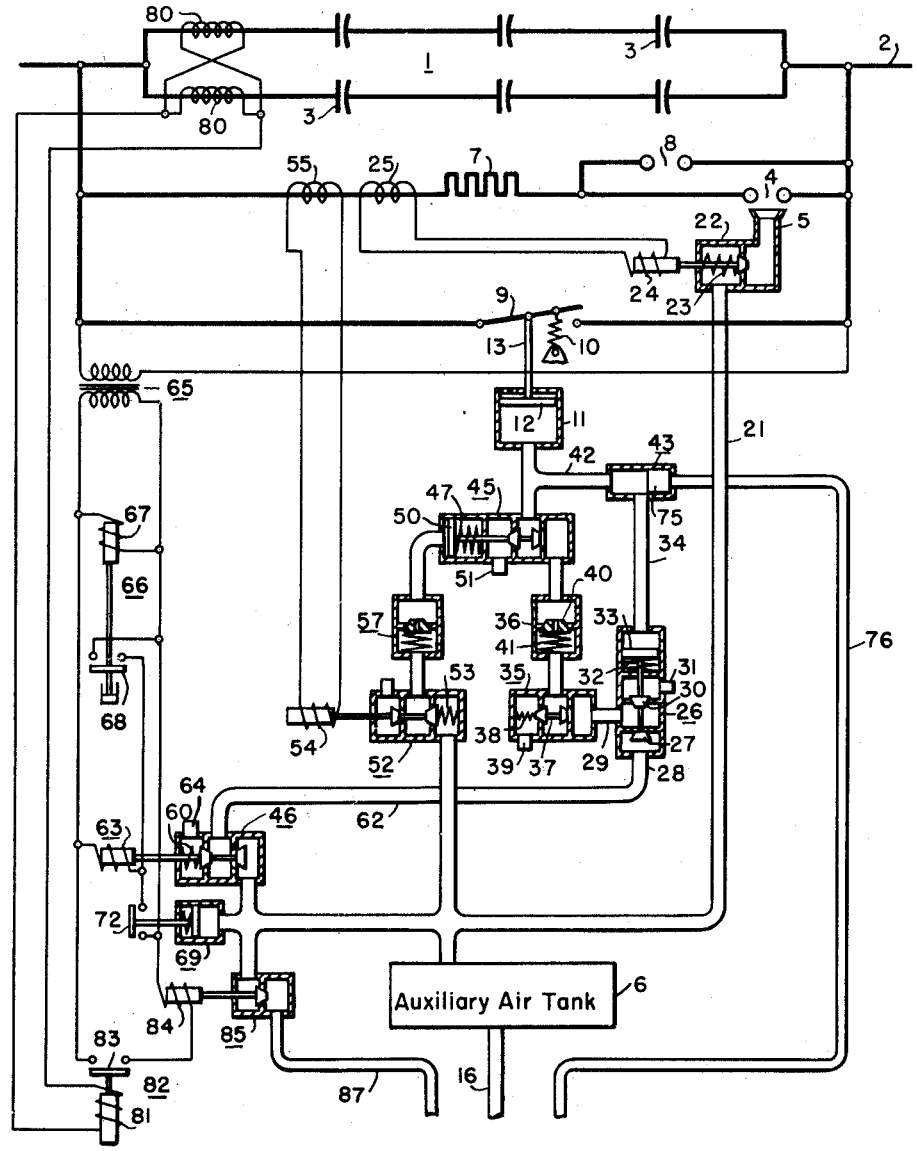

Other objects and advantages of the invention will be apparent from the following detailed description, taken in connection with the accompanying drawings, in which:

Figure 1 is a schematic diagram showing a series capacitor installation embodying the invention, and Fig. 2 is a similar diagram showing a modified embodiment of the invention.

Fig. 1 of the drawings shows a protective system for a series capacitor 1 installed in an alternating-current line 2. The line 2 represents one phase of a high-voltage, three-phase, synchronous transmission line in which the series capacitor 1 is installed for the purpose of raising the stability limit and thus increasing the amount of power that can be transmitted over the line. It will be understood that similar equipment is provided in each of the other two phases, which have not been shown in order to avoid unnecessary complication of the drawings. The series capacitor 1 consists of a number of individual capacitor units 3, connected in any suitable series or series-parallel arrangement to give the desired capacitive reactance and current capacity. The individual capacitor units 3 are thus connected in a bank which is connected in series in the line 2, and in the preferred embodiment, the series capacitor bank is divided into two equal parallel branches, for a purpose described hereinafter. The terms "series capacitor" or "capacitor" as used herein, are to be understood as including any necessary number of individual capacitor units, and the capacitor units 3 shown in the drawings are representative of any necessary number of individual capacitor units, a relatively large number of parallel-connected units normally being used.

The series capacitor 1 is protected against overvoltages resulting from faults, or other excess-current conditions, on the line 2 by means of a main spark gap device 4 connected across the capacitor 1. The spark gap device 4 preferably has massive carbon electrodes, so as to be capable of sustaining continued arcing for a reasonable time without damage, and is preferably of the type disclosed in the first-mentioned Marbury application referred to above, although any suitable construction might be used. The gap device 4 is made self-clearing by means of an air blast directed into the gap through a nozzle 5 from a compressed air tank 6. A resistor 7 is preferably connected in series with the gap device 4 across the capacitor 1. The resistor 7 may be primarily a damping resistor to damp the capacitor discharge in order to avoid damage to the capacitor by repeated charging and discharging as the gap 4 operates, and also to limit the inrush current from the capacitor when the gap breaks down, and to prevent excessive transient currents. If desired, however, the resistor 7 might have a higher value and be designed primarily to limit the voltage across the capacitor 1, so that the capacitor is not completely by-passed when the gap 4 breaks down, but is at least partially effective even during the existence of a fault, as more fully explained in the above-mentioned copending applications.

A back-up spark gap device 8, which may be of any suitable construction, is connected across the main gap device 4. The back-up gap 8 is intended to operate to protect the capacitor if the main gap 4 fails to operate for any reason, and the back-up gap 8 is therefore set to have a somewhat higher breakdown voltage than the main gap, so that it operates only if the main gap does not. Thus, the main gap 4 may be set for a breakdown voltage equal to about 250% of the normal voltage across the series capacitor 1, which is the maximum voltage that should be permitted to occur across the capacitor, while the back-up gap 8 may be set for a breakdown voltage of about 300% of the normal voltage, so that it will operate to protect the capacitor if the main gap 4 fails to operate.

A by-pass switch 9 is also connected across the series capacitor 1, in parallel with the gap devices 4 and 8, for by-passing the capacitor upon the occurrence of certain abnormal conditions. The by-pass switch 9 is biased to closed position by means of a spring 10, or other suitable biasing means, and is provided with a pneumatic cylinder 11 containing a piston 12 which is connected to the switch 9 by a link 13, or in any other suitable manner. The by-pass switch 9 is thus biased to closed position, but is normally held in the open position by means of air pressure admitted to the cylinder 11 from the air tank 6.

The electropneumatic system for controlling the air blast through the main gap 4, and for effecting operation of the by-pass switch 9, includes a main compressed air tank 14 and the auxiliary compressed air tank 6 mentioned above. The gap devices 4 and 8 and the by-pass switch 9, and their associated equipment, must, of course, be insulated from ground for the full line voltage, and since the line voltage may be quite high, of the order of 230 kv., for example, in the type of transmission system for which the invention is particularly intended, this means that the gap devices and switch are necessarily spaced a considerable distance from any apparatus at ground potential. The air supply from which the air blast is obtained must be closely adjacent the main gap 4, however, in order to avoid the delay incident to bringing the air from a relatively distant tank at ground potential, and it must be adequate to maintain the air blast as long as the gap 4 continues to arc. For this purpose, the auxiliary air tank 6 is utilized, and it is mounted closely adjacent the gap 4 and insulated from ground. The tank 6 is mounted above a column of hollow insulators 15 through which an insulating conduit 16 extends to the main air tank 14, which is at ground potential. The physical structure and arrangement of the insulator column 15 and the auxiliary air tank 6 may be as shown and described in the first-mentioned Marbury application referred to above, except that three insulating conduits or air lines are carried in the insulator column, as described hereinafter.

The main air tank 14 is supplied with air by means of a compressor 17 driven by a motor 18 supplied from any suitable low-voltage power source 19. The compressor 17 and motor 18 are controlled automatically in any suitable manner to maintain a desired air pressure, such as 250 pounds per square inch, in the main tank 14 and the main tank 14 is connected through the insulating conudit 16 to supply air to the auxiliary air tank 6. The pressure in the auxiliary air tank 6 is preferably maintained at a somewhat lower value, such as 150 pounds per square inch, by means of a suitable pressure regulator, or other means. With this arrangement, an adequate supply of compressed air for the air blast and for the switch 9 is placed closely adjacent these devices and insulated from ground, but the main air tank with its compressor and driving motor can be located at any suitable or convenient remote point and need not be insulated from ground. The main air tank and compressor, with their associated control equipment, are preferably placed in a housing, indicated at 20, which may be located at any convenient place, and a single main air tank 14 may be utilized to supply the three individual auxiliary air tanks 6 for the three phases of a three-phase installation.

The air blast is supplied to the main gap device 4 from the auxiliary air tank 6 through a conduit 21, and is controlled by means of a valve device 22. The blast valve 22 may be a pilot-operated valve to obtain rapid and reliable operation, but for simplicity it is shown as a single valve which is normally held closed by a spring 23, or other biasing means. The blast valve 22 is operated by a solenoid 24, which is energized in response to the flow of current in the circuit of the gap devices 4 and 8 by means of a current transformer 25. It will be apparent that when either of the gap devices breaks down and current starts to flow in the gap circuit, the blast valve 22 will be opened to direct a blast of air through the main gap device 4.

As described above, the by-pass switch 9 is normally held in open position by air pressure in the cylinder 11. Air is supplied to the cylinder 11 from the auxiliary air tank 6 through a main valve device 26. The main valve 26 has a valve element 27, which connects the valve inlet 28 to the outlet 29 when the valve is in the open position shown, and a valve element 30, which connects the outlet 29 to an exhaust opening 31 when the valve is in closed position. The main valve 26 is biased to the closed position by means of a spring 32, and is provided with a diaphragm or piston 33. The valve 26 is normally held in the open position, shown in the drawings, by means of air pressure admitted to the diaphragm 33 through a conduit 34, so that air is normally allowed to pass through the valve 26 to the cylinder 11.

Air flowing through the valve 26 from the inlet 28 to the outlet 29 passes through a pressure valve 35 and a throttle valve 36 and then into the cylinder 11. The pressure valve 35 is shown as having a valve element 37 which is biased toward closed position by a spring 38, but which is normally held open by pressure of the air passing through the valve. If the air pressure is sufficiently reduced, however, the spring 38 closes the valve 35 to cut off the flow of air, and opens an exhaust opening 39. The throttle valve 36 is designed to throttle air flowing through it towards the cylinder 11 but to allow free flow of air flowing from the cylinder 11, and is shown diagrammatically as having a valve element 40 with a small throttling orifice and with a light spring 41 for holding the valve element 40 in the position shown, so that air flowing towards the cylinder 11 is throttled through the orifice while air flowing in the opposite direction will move the valve element 40 against the force of the spring 41 to a sufficiently open position to allow free flow of air. A branch conduit 42 is provided for supplying air to the conduit 34, through a check valve 43. Under normal conditions, therefore, the parts are held in the positions shown by air pressure admitted through the inlet 28 and valve 26 to the cylinder 11 and to the diaphragm 33.

Air is admitted from the auxiliary air tank 6 to the main valve 26 through two control valves 45 and 46, which are disposed in parallel between the air tank 6 and the valve 26. The control valve 45 is a pneumatically-operated valve which is normally held in the open position shown by means of a spring 47, and which in this position allows air to flow from the tank 6 through a conduit 48 to a check valve 49, through which the air flows to the valve 26. The control valve 45 is provided with a piston 50 for moving the valve to the closed position in which the flow of air from the conduit 48 is shut off and the valve outlet is connected to an exhaust port 51. The valve 45 is operated by means of an auxiliary solenoid-operated valve 52. The valve 52 is normally held in the closed position shown by a spring 53, and is operated by a solenoid 54 which is connected to a current transformer 55 in the circuit of the gap devices 4 and 8. When energized, the solenoid 54 opens the valve 52 to admit air from the tank 6 through a conduit 56 to a throttling valve 57, and thence to the piston 50 of the control valve 45. The throttle valve 57 may be similar in construction to the valve 36 described above, and is arranged to throttle air flowing. toward the valve 45 and to allow free flow of air in the opposite direction. It will be seen that when the soleonid 54 is energized, the valve 52 is opened to admit air to the valve 45 to move it to closed position, a time delay being introduced by the throttle valve 57.

The second control valve 46 is a solenoid-operated valve which is normally held in open position, as shown, by means of a spring 60. In the open position, the valve 46 allows air to flow from the air tank 6 through a conduit 61 to a conduit 62 and through the check valve 49 to the main valve 26. The valve 46 is operated by a solenoid 63, and when the valve 46 is moved to closed position by energization of the solenoid, the conduit 62 is connected to an exhaust port 64. The valve 46 is operated in response to overvoltage across the series capacitor 1 by means of a potential transformer 65 which is connected directly across the capacitor. Energization of the solenoid 63 is controlled by a voltage relay 66 which has its operating coil 67 connected across the secondary of the potential transformer 65, and its contact 68 connected as shown to connect the solenoid 63 across the transformer 65 when the contact closes. The relay 66 is provided with a suitable time delay means, as indicated diagrammatically by a dashpot.

A low-pressure switch 69 is also provided for effecting operation of the valve 46. The switch 69 may be any suitable type of pressure switch and is shown as comprising a piston 70 which is biased by a spring 71 to the position in which the contact 72 is closed. The switch 69 is connected directly to the auxiliary air tank, as shown, so as to respond to the pressure in the tank which normally holds the contact 72 open. The contact 72 is connected in parallel with the relay contact 68, so that the solenoid 63 is energized when the contact 72 closes.

The check valve 49, through which air flowing through both of the control valves 45 and 46 passes, is a special check valve which is shown as having a floating piston or valve element 73 which controls the passage of air through the check valve from its two inlets to the inlet 28 of the main valve 26. When the pressure of the air entering both sides of the check valve 49 is approximately the same, the valve element 73 is held in the central position shown, allowing air to flow from both sides through the check valve to the main valve 26. If the pressure on either side of the check valve drops, however, the pressure on the opposite side will move the valve element 73 to close the check valve on the high-pressure side, while air is permitted to flow through the check valve is either direction on the low-pressure side.

The operation of the protective system, as so far described, is as follows. Under normal conditions, with normal current flowing in the line 2, the positions of the various valves are as shown in the drawings. Thus, the blast valve 22 is closed, and air is admitted from the tank 6 through the conduits 48 and 61, control valves 45 and 46, check valve 49, main valve 26, pressure valve 35, and throttle valve 36 to the cylinder 11 to hold the by-pass switch 9 open. Air is also admitted through the conduit 42 and check valve 43 to the diaphragm 33 to hold the main valve 26 in open position.

If a fault, or other excess-current condition, occurs on the line 2 so that the voltage across the capacitor 1 rises above the voltage for which the main gap 4 is set, the gap breaks down to by-pass the capacitor 1. As soon as current starts to flow through the gap circuit, the solenoid 24 is energized by the current transformer 25 and opens the blast valve 22 to initiate the air blast through the main gap 4. As previously explained, the arc in the gap 4 is extinguished at each current zero, and restrikes on the succeeding half-cycle as soon as the voltage reaches a value near the original breakdown voltage. As soon as the fault on the line 2 is cleared, or the excess-current condition passes, the arc will fail to restrike and the capacitor 1 is restored to service within the first half-cycle after the fault is cleared. When current ceases to flow in the gap circuit, the solenoid 24 is deenergized, and the blast valve 22 closes, cutting off the blast, a suitable time delay preferably being introduced to insure that the gap space is fully deionized and that the electrodes are sufficiently cooled to prevent restriking on the normal voltage.

If the main gap device 4 should fail to break down for any reason, the back-up gap will operate and thus protect the capacitor. The flow of current in the gap circuit resulting from operation of the back-up gap will, of course, actuate the blast valve 22 as before, but the air blast will not affect the back-up gap 8 which will continue to arc.

Current flow in the gap circuit also energizes the solenoid 54 from the current transformer 55, simultaneously with the energization of the solenoid 24. When the solenoid 54 is energized, the auxiliary valve 52 is opened and air flows from the air tank 6 through the conduit 56 and throttle valve 57 to the control valve 45. If the arc in the main gap 4 is extinguished within the expected time, the solenoid 54 is deenergized and the valve 52 returns to its closed position, shutting off the flow of air and exhausting the air that has been admitted through the throttle valve to the control valve 45, before the valve 45 has operated. If current flow in the gap circuit continues, however, either because the arc in the main gap is not extinguished in the expected time, or because the back-up gap 8 has operated, the air admitted to the piston 50 of the control valve 45 builds up sufficient pressure to operate the valve 45 after a time delay determined by the adjustment of the throttle valve 57. The valve 57 may be adjusted for any suitable time delay, such as 15 cycles, which may be slightly greater than the time normally required to clear a fault on the line 2, or which may be determined by the maximum time for which the gap 4 can continue to arc without damage.

If current flow in the gap circuit continues beyond the time for which the throttle valve 57 is adjusted, the control valve 45 is operated to closed position shutting off the flow of air from the conduit 48 to the check valve 49 and opening the exhaust port 51. The pressure on the right-hand side of the check valve 49 thus drops to substantially atmospheric pressure, and the pressure in the conduit 62, acting on the other end of the check valve, moves it to the right to shut off the conduit 62. The cylinder 11 is thus connected directly to the exhaust port 51 through the throttle valve 36, which allows free flow of the air in the exhaust direction, pressure valve 35, main valve 26, and check valve 49, and the air in the cylinder is exhausted, allowing the by-pass switch 9 to close. At the same time, the air is exhausted from the diaphragm 33 of the main valve 26, through the conduit 42, so that the valve 26 closes and connects its outlet 29 to the exhaust port 31, thus allowing the air to exhaust more directly and more rapidly from the cylinder 11. Since the valve 26 is normally held open by air pressure on the diaphragm 33, which must be exhausted to allow the valve to close, its operation may not always be as rapid as desired. The pressure valve 35 is utilized for this reason, and as soon as the pressure drops, due to operation of the control valve 45, the valve 35 closes and opens its exhaust port 39, so that air from the cylinder 11 and valve 26 is exhausted very rapidly, thus effecting rapid closing of the switch 9 to by-pass the capacitor 1.

As soon as the switch 9 closes, the arc in the gap 4 or the gap 8, as the case may be, is, of course, extinguished and current ceases to flow in the gap circuit. The solenoid 54 is thus deenergized and the valve 52 returns to its closed position, shutting off the air from the control valve 45 and allowing it to return to its normal open position. When the valve 45 opens, air is again admitted from the conduit 48 to the check valve 49, which is restored to its normal position shown, and to the inlet 28 of the main valve 26. The main valve 26, however, remains closed since air cannot get to the diaphragm 33 to open the valve, and thus the switch 9 remains closed, since the air supply to the cylinder 11 is cut off by the valve 26.

The capacitor 1 is protected against moderate overvoltages by means of the second control valve 46. It will be understood that moderate overvoltages of lower magnitude than the setting of the main gap 4 may occur across the capacitor due to unusually heavy currents in the line 2, or other reasons, and such lower overvoltages may be permitted for limited periods of time without damage to the capacitor. Such moderate overvoltages, however, may be damaging if allowed to continue for an extended time, and the capacitor must, therefore, be protected against sustained overvoltages lower than the breakdown voltage of the gap 4. The relay 66 is set to respond to an overvoltage of predetermined magnitude, such as 110% of normal voltage, with a suitable time delay and preferably has inverse time characteristics so that the time delay is shorter on higher overvoltages. When such a sustained overvoltage occurs, the relay 66 closes its contact 68 to connect the solenoid 63 across the potential transformer 65. The solenoid 63 is thus energized and moves the control valve 46 to closed position, shutting off the air from the conduit 62 and check valve 49, and connecting the conduit 62 to the exhaust port 64. When the pressure drops in the conduit 62, the check valve 49 is moved to the left by the air pressure in its right-hand end, and thus shuts off the air pressure from the conduit 48 while leaving the conduit 62 connected to the main valve 26. The cylinder 11 is thus exhausted through the conduit 62 and exhaust port 64, the operation being the same as described above to exhaust the cylinder 11 and to cause the main valve 26 to close. As soon as the by-pass switch 9 closes, the voltage across the potential transformer 65 falls to substantially zero, and the solenoid 63 is deenergized, so that the valve 46 returns to its open position to again admit air pressure to check valve 49 and the inlet 28 of the main valve 26. As described above, however, the valve 26 remains closed.

Protection against loss of air pressure, or abnormally low air pressure, is provided by the pressure switch 69, which responds to the pressure in the air tank 6. Low pressure in the air tank 6 causes the pressure switch 69 to close its contact 72, which energizes the solenoid 63 and causes operation of the valve 46 to exhaust air from the cylinder 11 and permit the by-pass switch 9 to close, as described above.

It will be seen, therefore, that either operation of the back-up gap 8, prolonged arcing of the main gap 4, sustained moderate overvoltage on the capacitor 1, or low pressure in the air tank 6 will cause the by-pass switch 9 to close, and that it will then remain closed until the main valve 26 is reopened. The main valve 26 is reopened by remote manual means which operates to admit air to the diaphragm 33 through the check valve 43. The check valve 43 is shown as having a movable piston or valve element 75, which is normally in the position shown to connect the conduit 42 to the conduit 34. When air pressure is admitted to the opposite side of the check valve 43, however, the piston 75 is free to move to the opposite end to allow air to flow from the right-hand side of the check valve to the conduit 34. Air is supplied to the valve 26 direct from the main air tank 14 by means of an insulating conduit 76 which passes through the insulator column 15 and is connected to the check valve 43. A control valve 77 is provided, which may conveniently be located in the compressor housing 20, and which is manually operated by a push button 78, or in any other suitable manner.

When the push button 78 is actuated, air flows directly from the main tank 14 through the conduit 76 to the check valve 43, and through the conduit 34 to the diaphragm 33 of the valve 26, the valve element 75 moving to the left. The air pressure thus applied to the diaphragm 33 moves the valve 26 to open position and allows air to flow from the check valve 49 to the pressure switch 35, which is opened by the air pressure to allow air to flow through the throttle valve 36 to the cylinder 11 to open the switch 9. The valve 36 throttles the flow of air towards the cylinder, so that the pressure in the cylinder builds up gradually, and the switch is opened gently without injurious slamming. The air flowing to the cylinder 11 also flows into the conduit 42, and as soon as the push button 78 is released and the air pressure in the conduit 76 drops, the valve element 75 is moved back to the right to admit air from the conduit 42 to the diaphragm 33 to hold the valve 26 in open position. Thus, it will be seen that the switch 9 is reopened merely by actuating the push button 78 and holding it momentarily until the air pressure has built up sufficiently in the conduit 42 to hold the valve 26 open. Since the valve 77 is insulated from the high-voltage equipment by the insulating conduit 76, it can safely be operated manually and can be disposed at any convenient remote location.

The individual capacitor units making up the capacitor bank 1 are normally provided with individual fuses so that in case of failure of a capacitor unit, its fuse will blow and remove the faulted capacitor from the circuit. There is usually a relatively large number of individual capacitor units in a series capacitor bank of the type here involved, so that removal of one, or several, units from the circuit does not sufficiently change the characteristics of the bank to require immediately removing it from service. It is desirable, however, to know of the presence of a faulted unit, or a blown fuse, so that the unit can be replaced at a convenient time.

In order to provide an indication of the operation of one or more individual capacitor fuses, the bank 1 is divided into two equal parallel branches, as shown, and a current transformer 80 is connected in each branch. The current transformers 80 are cross-connected to the coil 81 of a relay 82, which has its contact 83 connected to connect the solenoid 84 of a solenoid-operated valve 85 across the potential transformer 65 when the contact 83 closes. Since the two parallel branches of the capacitor bank 1 are equal, the current will normally divide equally between the two branches, and there will be no resultant current in the relay coil 81. If one or more capacitor fuses should blow in either branch of the bank, the impedance of that branch is changed and the currents in the two branches will no longer be equal. This unbalance in the currents causes a current in the coil 81, and the relay 82 closes its contact to energize the solenoid 84 of the valve 85. The valve 85 is normally closed and when opened by energization of the solenoid 84, it admits air from the auxiliary air tank 6 to an insulating conduit 87 which extends through the insulator column 15 to ground level and is connected to a pressure switch 88. When pressure from the air tank 6 is admitted to the pressure switch 88 by operation of the valve 85, the switch 88 closes its contact 83, which is connected to complete a circuit to a signal lamp 90, or other suitable signal or indicating device, either visual or audible, to indicate operation of one or more individual capacitor fuses.

When current flows in the gap circuit through the resistor 7, due to operation of the main gap 4 or the back-up gap 8, the resistor is heated by the heavy fault current, and if current flow continues beyond the expected time, the heating effect may be injurious to the resistor. For this reason, it is desirable to close the by-pass switch 9 as rapidly as possible as soon as current flow has continued beyond the predetermined time for which the throttle valve 57 is adjusted. In order to close the switch as rapidly as possible, it is necessary to exhaust the air from the cylinder 11 very rapidly, and in the system described above, the pressure valve 35 is provided for this purpose, so that the cylinder 11 will be exhausted as directly and as rapidly as possible.

In Fig. 2 of the drawings, there is shown an alternative arrangement in which the cylinder 11 is exhausted still more directly and therefore more rapidly. The elements of the system shown in Fig. 2 are the same as those of Fig. 1 and are identified by the same reference numerals. In this arrangement, however, the pneumatically-operated control valve 45 is interposed between the cylinder 11 and the throttle valve 36, the valve 45 being operated as before by air admitted through the auxiliary valve 52 and throttle valve 57. The solenoid-operated control valve 46 is connected directly to the inlet 28 of the main valve 26.

In this embodiment of the invention, air is normally admitted from the air tank 6 through the normally open control valve 46, conduit 62, main valve 26, pressure valve 35, throttle valve 36 and normally open control valve 45 to the cylinder 11 to hold the by-pass switch 9 open. Upon operation of either of the gap devices, the valve 45 is operated in the manner previously described by air pressure admitted through the auxiliary valve 52 and throttle valve 57 to close the valve 45 if current flow continues for more than a predetermined time. When the valve 45 closes, it connects the cylinder 11 directly to the exhaust port 51, so that the air is exhausted directly and very rapidly and the switch 9 closes almost instantaneously. The main valve 26 also closes due to exhaustion of the air pressure from the diaphragm 33, and thus the valve 26 remains closed when the valve 45 returns to its open position. Operation of the valve 46 to exhaust air from the cylinder 11 to close the by-pass switch upon the occurrence of a sustained lower overvoltage is exactly as previously described. After operation of either of the control valves, the by-pass switch is reopened by operation of the valve 26 by means of the valve 77 in the manner previously described. It will be apparent that the operation of the arrangement shown in Fig. 2 is substantially the same as that of Fig. 1 but that the arrangement of the valves is such that very rapid exhaust of air from the cylinder 11 is obtained, so that the by-pass switch 9 is closed very rapidly to relieve the resistor 7 from the heating effect of continued current flow.

It should now be apparent that a protective system has been provided for series capacitors installed in high-voltage transmission lines which provides effective and rapid protection against overvoltage on the capacitor due to fault currents in the line, and which restores the capacitor to service immediately after the fault is cleared. Rapid and effective protection is also provided against other abnormal conditions which would be dangerous to the capacitor. Certain specific embodiments of the invention have been shown and described for the purpose of illustration, but it will be apparent that various modifications and other embodiments are possible within the scope of the invention. It is to be understood, therefore, that the invention is not limited to the specific details shown and described, but in its broadest aspects it includes all equivalent embodiments and modifications which come within the scope of the appended claims.

I claim as my invention:

1. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a by-pass switch connected across the capacitor and main gap device, biasing means for biasing the by-pass switch to closed position, a pneumatic cylinder connected to the by-pass switch, a main valve device for admitting air from the air tank to said cylinder to normally hold the by-pass switch in open position, said main valve device being biased to closed position and including pneumatic means for controlling the position of the main valve device, means for admitting air to said pneumatic means to normally hold the main valve device in open position, and means responsive to a predetermined abnormal condition for exhausting the air from said cylinder to permit the by-pass switch to close and for exhausting air from the pneumatic means to permit the main valve device to close and shut off the air supply to the cylinder.

2. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a by-pass switch connected across the capacitor and main gap device, biasing means for biasing the by-pass switch to closed position, a pneumatic cylinder connected to the by-pass switch, a main valve device for admitting air from the air tank to said cylinder to normally hold the by-pass switch in open position, said main valve device being biased to closed position and including pneumatic means for controlling the position of the main valve device, means for admitting air to said pneumatic means to normally hold the main valve device in open position, means responsive to a predetermined abnormal condition for exhausting the air from said cylnder to permit the by-pass switch to close and for exhausting air from the pneumatic means to permit the main valve device to close and shut off the air supply to the cylinder, and remote manual means for admitting air to the pneumatic means for effecting opening of the main valve device to admit air to the cylinder to reopen the by-pass switch.

3. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a by-pass switch connected across the capacitor and main gap device, biasing means for biasing the by-pass switch to closed position, a pneumatic cylinder connected to the by-pass switch, a main valve device for admitting air from the air tank to said cylinder to normally hold the by-pass switch in open position, said main valve device being biased to closed position and including pneumatic means for controlling the position of the main valve device, means for admitting air passing through the main valve device to said pneumatic means to normally hold the main valve device in open position, and means responsive to a predetermined abnormal condition for exhausting air from said cylinder and said pneumatic means to permit the by-pass switch to close and to cause the main valve device to close and remain closed to shut off the air supply to the cylinder.

4. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a by-pass switch connected across the capacitor and main gap device, biasing means for biasing the by-pass switch to closed position, a pneumatic cylinder connected to the by-pass switch, a main valve device for admitting air from the air tank to said cylinder to normally hold the by-pass switch in open position, said main valve device being biased to closed position and including pneumatic means for controlling the position of the main valve device, means for admitting air passing through the main valve device to said pneumatic means to normally hold the main valve device in open position, means responsive to a predetermined abnormal condition for exhausting air from said cylinder and said pneumatic means to permit the by-pass switch to close and to cause the main valve device to close and remain closed to shut off the air supply to the cylinder, and remote manual means for admitting air to the pneumatic means for effecting opening of the main valve device to admit air to the cylinder to reopen the by-pass switch.

5. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, an auxiliary compressed air tank adjacent said main gap device, a main compressed air tank remote from the auxiliary air tank, insulating conduit means connecting the main air tank to the auxiliary air tank to supply air thereto, means for directing a blast of air from the auxiliary air tank through the main gap device as soon as it has broken down, a by-pass switch connected across the capacitor and main gap device, biasing means for biasing the by-pass switch to closed position, a pneumatic cylinder connected to the by-pass switch, a main valve device for admitting air from the auxiliary air tank to said cylinder to normally hold the by-pass switch in open position, said main valve device being biased to closed position and including pneumatic means for controlling the position of the main valve device, means for admitting air to said pneumatic means to normally hold the main valve device in open position, means responsive to a predetermined abnormal condition for exhausting the air from said cylinder to permit the by-pass switch to close and for exhausting air from the pneumatic means to permit the main valve device to close and shut off the air supply to the cylinder, and remote manual means for admitting air directly from the main air tank to said pneumatic means for effecting opening of the main valve device to admit air from the auxiliary air tank to the cylinder to reopen the by-pass switch.

6. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, an auxiliary compressed air tank adjacent said main gap device, a main compressed air tank remote from the auxiliary air tank, insulating conduit means connecting the main air tank to the auxiliary air tank to supply air thereto, means for directing a blast of air from the auxiliary air tank through the main gap device as soon as it has broken down, a by-pass switch connected across the capacitor and main gap device, biasing means for biasing the by-pass switch to closed position, a pneumatic cylinder connected to the by-pass switch, a main valve device for admitting air from the auxiliary air tank to said cylinder to normally hold the by-pass switch in open position, said main valve device being biased to closed position and including pneumatic means for controlling the position of the main valve device, means for admitting air passing through the main valve device to said pneumatic means to normally hold the main valve device in open position, means responsive to a predetermined abnormal condition for exhausting air from said cylinder and said pneumatic means to permit the by-pass switch to close and to cause the main valve device to close and remain closed to shut off the air supply to the cylinder, and remote manual means for admitting air directly from the main air tank to the pneumatic means for effecting opening of the main valve device to admit air from the auxiliary air tank to the cylinder to reopen the by-pass switch.

7. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a second spark gap device connected across the main gap device, said second spark gap device having a higher breakdown voltage than the main gap device, a by-pass switch connected across the capacitor, biasing means for biasing the by-pass switch to closed position, a pneumatic cylinder connected to the by-pass switch, a main valve device for admitting air from said air tank to said cylinder to normally hold the by-pass switch in open position, said main valve device including means for biasing the valve device to closed position and pneumatic means for controlling the position of the main valve device, means for admitting air passing through the main valve device to said pneumatic means to normally hold the main valve device in open position, first and second control valves, each of said control valves being adapted, when operated, to exhaust air from the cylinder and from the pneumatic means to permit the by-pass switch to close and to permit the main valve device to move to closed position to shut off the air from the cylinder, time delay means for effecting operation of the first control valve in response to current flow in the circuit of the gap devices, and time delay means for effecting operation of the second control valve in response to a voltage across the capacitor in excess of a predetermined magnitude.

8. A series capacitor installation as defined in claim 7 including remote manual means for admitting air to the pneumatic means of the main valve device to effect opening of the main valve device to admit air to the cylinder to reopen the by-pass switch.

9. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a second spark gap device connected across the main gap device, said second spark gap device having a higher breakdown voltage than the main gap device, a by-pass switch connected across the capacitor, biasing means for biasing the by-pass switch to closed position, a pneumatic cylinder connected to the by-pass switch, a main valve device for admitting air from said air tank to said cylinder to normally hold the by-pass switch in open position, said main valve device including means for biasing the valve device to closed position and pneumatic means for controlling the position of the main valve device, means for admitting air passing through the main valve device to said pneumatic means to normally hold the main valve device in open position, first and second control valves, each of said control valves being adapted, when operated, to exhaust air from the cylinder and from the pneumatic means to permit the by-pass switch to close and to permit the main valve device to move to closed position to shut off the air from the cylinder, the first control valve being a pneumatically-operated valve, a current-responsive auxiliary valve adapted to admit air from the air tank to the first control valve to effect operation thereof in response to current flow in the circuit of the gap devices, time delay means for delaying operation of the first control valve a predetermined time after current starts to flow in said circuit, the second control valve being a solenoid-operated valve, and time delay relay means for effecting operation of the second control valve in response to a voltage across the capacitor in excess of a predetermined value.

10. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, an auxiliary compressed air tank adjacent said mian gap device, a main compressed air tank remote from the auxiliary air tank, insulating conduit means connecting the main air tank to the auxiliary air tank to supply air thereto, means for directing a blast of air from the auxiliary air tank through the main gap device as soon as it has broken down, a second spark gap device connected across the main gap device, said second spark gap device having a higher breakdown voltage than the main gap device, a by-pass switch connected across the capacitor, biasing means for biasing the by-pass switch to closed position, a pneumatic cylinder connected to the by-pass switch, a main valve device for admitting air from said auxiliary air tank to said cylinder to normally hold the by-pass switch in open position, said main valve device including means for biasing the valve device to closed position and pneumatic means for controlling the position of the main valve device, means for admitting air passing through the main valve device to said pneumatic means to normally hold the main valve device in open position, first and second control valves, each of said control valves being adapted, when operated, to exhaust air from the cylinder and from the pneumatic means to permit the by-pass switch to close and to permit the main valve device to move to closed position to shut off the air from the cylinder, the first control valve being a pneumatically-operated valve, a current-responsive auxiliary valve adapted to admit air from the auxiliary air tank to the first control valve to effect operation thereof in response to current flow in the circuit of the gap devices, time delay means for delaying operation of the first control valve a predetermined time after current starts to flow in said circuit, the second control valve being a solenoid-operated valve, time delay relay means for effecting operation of the second control valve in response to a voltage across the capacitor in excess of a predetermined value, and remote manual means for admitting air directly from the main air tank to the pneumatic means of the main valve device to effect opening of the main valve device to admit air to the cylinder to reopen the by-pass switch.

11. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a second spark gap device connected across the main gap device, said second gap device having a higher break-down voltage than the main gap device, a by-pass switch connected across the capacitor and main gap device, biasing means for biasing the by-pass switch to closed position, a pneumatic cylinder connected to the by-pass switch, a main valve device for admitting air from the air tank to said cylinder to normally hold the by-pass switch in open position, said main valve device including means for biasing the valve device to closed position and pneumatic means for controlling the position of the valve device, means for admitting air passing through the main valve device to said pneumatic means to normally hold the main valve device in open position, a pneumatically-operated first control valve, a solenoid-operated second control valve, said control valves being interposed in parallel between the main valve device and the air tank, each of said control valves being adapted, when operated, to exhaust the air from the cylinder and from the pneumatic means of the main valve device to permit the by-pass switch to close and to permit the main valve device to move to closed position to shut off the air supply to the cylinder, a current-responsive auxiliary valve for effecting operation of the first control valve in response to current flow in the circuit of the gap devices, time delay means for delaying operation of the first control valve a predetermined time after current starts to flow in said circuit, and time delay relay means for effecting operation of the second control valve in response to a voltage across the capacitor in excess of a predetermined value.

12. A series capacitor installation as defined in claim 11 including remote manual means for admitting air to the pneumatic means of the main valve device to effect opening of the main valve device to admit air to the cylinder to reopen the by-pass switch.

13. A series capacitor installation for an alternating-current line comprising a capacitor adapted to be connected in series in said line, a main spark gap device connected across said capacitor and adapted to break down and become conducting whenever the instantaneous voltage across the capacitor exceeds a predetermined value, a compressed air tank, means for directing a blast of air from said air tank through the main gap device as soon as it has broken down, a second spark gap device connected across the main gap device, said second gap device having a higher break-down voltage than the main gap device, a by-pass switch connected across the capacitor and main gap device, biasing means for biasing the by-pass switch to closed position, a pneumatic cylinder connected to the by-pass switch, a main valve device for admitting air from the air tank to said cylinder to normally hold the by-pass switch in open position, said main valve device including means for biasing the valve device to closed position and pneumatic means for controlling the position of the valve device, means for admitting air passing through the main valve device to said pneumatic means to normally hold the main valve device in open position, a pneumatically-operated first control valve interposed between the main valve device and the cylinder and adapted, when operated, to exhaust air directly from the cylinder to permit the by-pass switch to close and to exhaust air from the pneumatic means of the main valve device to permit the main valve device to move to closed position to shut off the air supply to the cylinder, time delay current-responsive means for effecting operation of said first control valve a predetermined time after current starts to flow in the circuit of the gap devices, a solenoid-operated second control valve interposed between the main valve device and the air tank and adapted, when operated, to exhaust air from the cylinder through the main valve device to permit the by-pass switch to close and to exhaust air from the pneumatic means of the main valve device to permit the main valve device to move to closed position to shut off the air supply to the cylinder, and time delay relay means for effecting operation of the second control valve in response to a voltage across the capacitor in excess of a predetermined value.

14. A series capacitor installation as defined in claim 13 including remote manual means for admitting air to the pneumatic means of the main valve device to effect opening of the main valve device to admit air to the cylinder to reopen the by-pass switch.

FLOYD D. JOHNSON.

No references cited.